Figure 1:
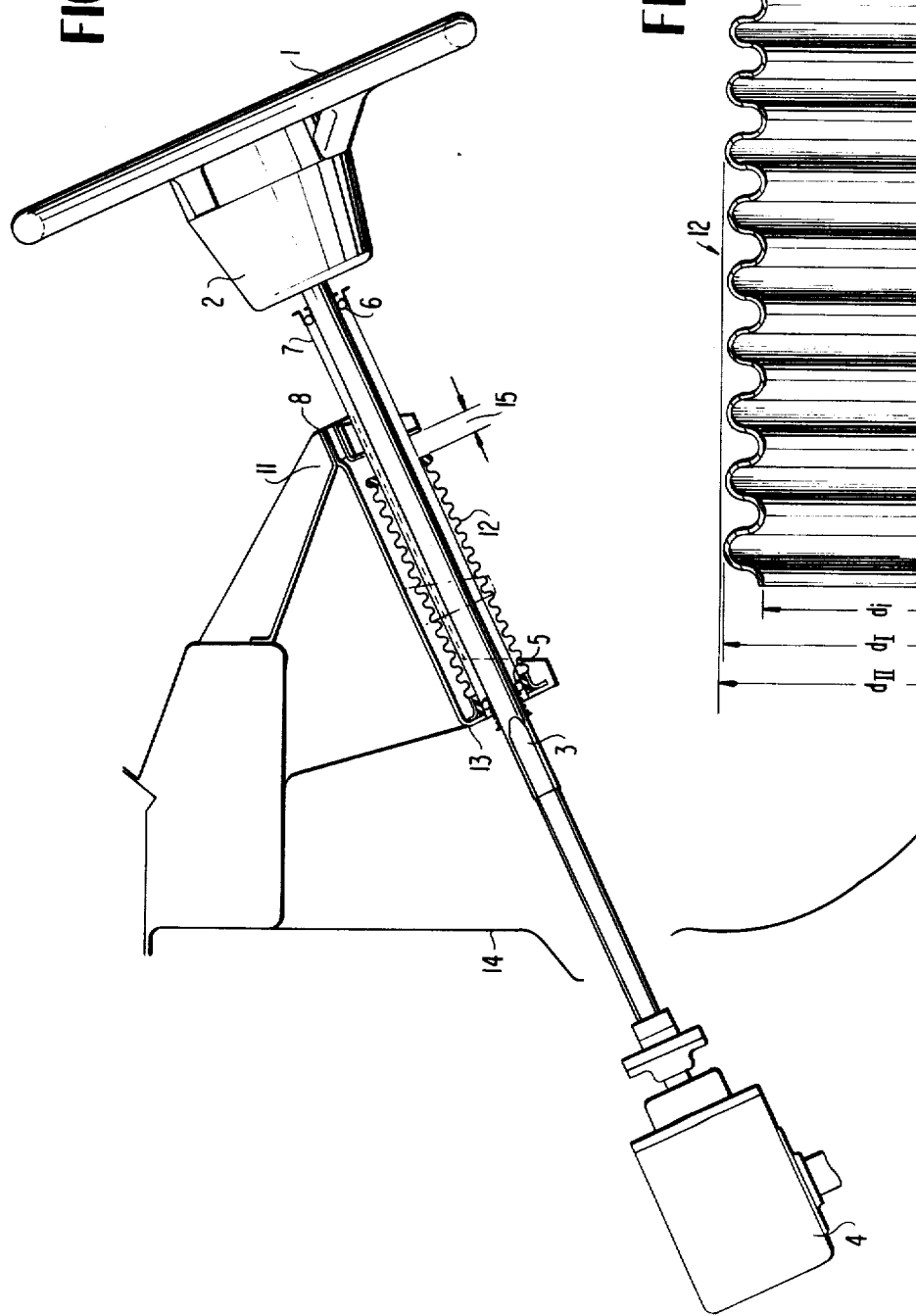

United States Patent [19]

Köpf

[11] 4,050,326
[45] Sept. 27, 1977

[54] SAFETY STEERING COLUMN FOR PASSENGER MOTOR VEHICLES

[75] Inventor: Wolfgang Köpf, Stuttgart, Germany

[73] Assignee: Daimler-Benz Aktiengesellschaft, Germany

[21] Appl. No.: 656,524

[22] Filed: Feb. 9, 1976

[30] Foreign Application Priority Data

Feb. 8, 1975 Germany .................... 2505340

[51] Int. Cl.² ............................................. B62D 1/18
[52] U.S. Cl. ...................................... 74/492; 188/1 C
[58] Field of Search ................... 74/492, 493; 188/1 C

[56] References Cited

U.S. PATENT DOCUMENTS

| 3,167,974 | 2/1965 | Wilfert | 74/492 X |
| 3,373,629 | 3/1968 | Wight et al. | 188/1 C X |
| 3,492,888 | 2/1970 | Nishimura et al. | 188/1 C X |
| 3,508,633 | 4/1970 | Nishimura et al. | 188/1 C |
| 3,699,624 | 10/1972 | DeGain | 74/492 X |
| 3,748,922 | 7/1973 | Farrell | 74/492 |
| 3,760,650 | 9/1973 | Pardy | 74/492 |

*Primary Examiner*—Allan D. Herrmann
*Attorney, Agent, or Firm*—Craig & Antonelli

[57] ABSTRACT

A safety steering column for passenger motor vehicles with an axially compressible steering shaft and with an energy absorbing deformation member surrounding the steering shaft, which, on the one hand, is axially supported at a point fixed relative to the body and, on the other, is axially actuatable by an abutment part connected with the axially movable part of the steering shaft; the deformation member thereby includes an undulated tubular member having different values in its axial rigidity along different axial sections that are realized at the undulated tubular member itself.

5 Claims, 2 Drawing Figures

SAFETY STEERING COLUMN FOR PASSENGER MOTOR VEHICLES

The present invention relates to a safety steering column for passenger motor vehicles with an axially compressible steering shaft and with a shock-absorbing deformation member containing an undulated tubular member, which surrounds the steering shaft and which, on the one hand, is axially supported at a point fixed at the body and, on the other hand, is adapted to be axially loaded or stressed by an abutment part connected with the axialy movable part of the steering shaft, whereby the deformation member has different values of axial rigidity along different axial sections.

Such a safety steering column is described, for example, in the German Offenlegungsschrift No. 2 044 874. The differing rigidity or strength of the deformation member is provided for the purpose to equalize or compensate for the non-uniform force development in the force/path diagram of the deformation in prior art deformation members which were observed from tests simulating actual conditions, and to constitute the areas under the force/path characteristic curve which is equal to the work absorbing capability, as large as possible with a predetermined maximum force, i.e., to impart to the characteristic curve as constant a configuration as possible within the middle range. A modified embodiment of the deformation member of differing rigidity of the aforementioned prior art safety steering column thereby consists of an undulated tubular member having a constant undulation and a sort of lost path or travel representing a lead distance secured by shearing pins which must be traversed before the deformation member of such prior art safety steering column comes into abutment. It is disadvantageous in this construction that the rigidity of the deformation member has only two rigidity values and that the work-absorption capability of the lost path or lead distance is determined essentially by the shearing pins, i.e., is therefore relatively small and limited to a relatively short path. The work-absorption capability of the lead distance thereby cannot be subjected to design variations, i.e., removes itself, so to speak of, from design discipline.

Another type of safety steering column is known in the art (cf. German Offenlegungsschrift No. 2 052 306), in which the steering shaft itself is constructed at least partly also as shock absorbing deformation member, namely as undulated tubular member so that two concentrically nested tubular members are present in the steering column. The steering shaft undulated tubular member is thereby so constructed and arranged that initially it has to absorb only the impact energy because it lies at first alone in the force-flow, i.e., in the force-transmitting connection. Only after a certain deformation distance also the outer undulated tubular member comes into abutment in the force flow and contributes to the shock absorption. This construction can also be modified according to the aforementioned publication to the extent that one of the tubular members, namely the steering shaft tubular member is suspended at the one support by way of an intentional breaking or rupturing place, for example, by way of a shearing pin and in that this intentional breaking place yields, beginning with a predetermined force value so that when exceeding the rupture force, only one of the undulated tubular members is still arranged in the force-flow or force-transmitting connection and has to absorb alone the deformation energy. While compared to the aforementioned steering columns, this steering column offers the advantage of an aimed-at intentional design of the two steps of the energy absorption, it nevertheless entails the disadvantage that two different undulated tubular members are necessary therefor. Additionally, the undulated tubular members are not secured against bending or buckling so that the greater probability exists that after a small deformation of the undulated tubular members, the same buckle out laterally in an uncontrolled manner. However, a far smaller amount in impact energy is absorbed in that case than with a buckle-free axial deformation.

It is further known in connection with safety steering columns to provide undulated tubular-member-like deformation members having a differing rigidity in the axial direction, so-called conical impact pots (cf. German Patent No. 1 229 806 or German Offenlegungsschrift No. 1 903 255). A progression in the force/path characteristic curve of the deformation member is achieved thereby which serves the purpose to oppose to the movement an increasing resistance with an increasing deformation. One of the two last-mentioned prior art publications discloses a non-guided buckling impact pot whereas the other one discloses a deformation member stressed in tension.

It is additionally known in conjunction with safety steering columns (cf., for example, German Offenlegungsschrift No. 2 140 221) that the rigidity can be varied within wide limits by the dimensions of an undulated tubular member such as length and depth of the undulations, material thickness and material quality in order to achieve a certain characteristic of the plastic deformation. It is additionally known also (cf. German Auslegeschrift No. 1 630 857) to influence by means of slots in the undulated tubular members, and more particularly by the depth and number thereof, the characteristics of the undulated tubular members during the deformation thereof.

Based on this state of the art, it is proposed according to the present invention for purposes of increasing the work-absorption-capability by keeping far-reachingly constant the deformation force near the maximum permissive force that in the safety steering column of the aforementioned type the differing rigidity values are realized at the undulated tubular member itself. Advantageously the rigidity values may be varied step-wise over the length of the undulated tubular member. Provision may be made in a manner favorable from a manufacturing point of view that the wall thickness and the material properties are unchanged over the length of the undulated tubular member whereas the undulation depth and height and/or the undulation lengths are varied over the length of the undulated tubular member.

Accordingly, it is an object of the present invention to provide a safety steering column for passenger motor vehicles which avoids by simple means the aforementioned shortcomings and drawbacks encountered in the prior art.

Another object of the present invention resides in a safety steering column for passenger motor vehicles in which the rigidity of the deformation member is not limited to only two values.

A further object of the present invention resides in a safety steering column for passenger motor vehicles in which the work-absorption capacity is increased.

Still another object of the present invention resides in a safety steering column for passenger motor vehicles which utlizes relatively few parts, yet effectively precludes an uncontrolling buckling of the deformation member.

Figure 2:
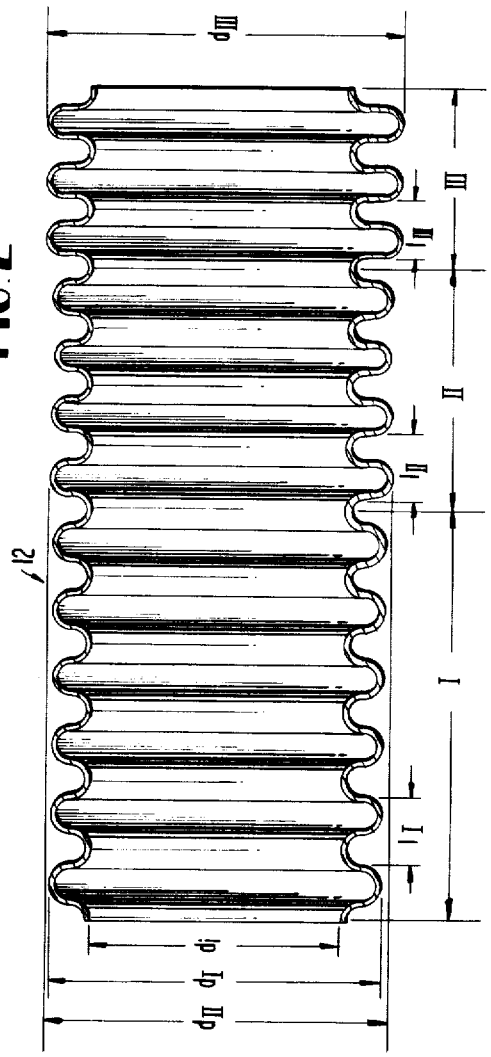

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a safety steering system in accordance with the present invention, partly in cross section; and FIG. 2 is an axial cross-sectional view through the stepped undulated tubular member.

Referring now to the drawing wherein like reference numerals are used throughout the two views to designate like parts, the safety steering illustrated in the drawing includes a steering wheel 1 with a so-called impact pot 2, and a steering spindle 3 adjoining the same and of two-partite construction, which establishes the connection with the steering gear 4. The steering spindle 3 is supported on the inside of an outer column 7 by means of two bearings 5 and 6, whereby the outer column 7 extends only over a portion of the length of the steering spindle 3 and, in its turn, is retained at a relatively fixed vehicle part 11 by way of a bracket or side bar 8 having an elongated guidance (not shown) by means of pins or bolts (not shown) adapted to be sheared off. An undulated tubular member 12 (FIGS. 1 and 2) provided axially with undulation dimensions changed step-wise is placed over the outer column 7 within the area between this outer column fastening and the end area thereof remote from the steering wheel 1; the inner diameter of the undulated tubular member 12 is only slightly larger than the outer diameter of the outer column 7. As a result thereof, the undulated tubular member 12 is guided against lateral buckling and the axial deformation energy of the undulated tubular member can become effective without reduction. The end of the undulated tubular member 12 remote from the steering wheel 1 is supported at a fixed vehicle part 13 which is arranged at a distance from the end wall 14 so that deformations of the end wall 14 which occur in case of an accident, cannot have any effect on the undulated tubular member 12.

The undulated tubular member 12 illustrated in detail and on an enlarged scale in FIG. 2 which has stepped undulations, includes three sections I, II and III in which the axial rigidity of the undulations are constructed differently. The material and material thickness as well as the inner diameter $d_i$ are kept constant over the entire length of the undulated tubular member in a manner favorable from a manufacturing point of view. However, the outer diameter of the undulated tubular member $d_I$, $d_{II}$ and $d_{III}$ and the corresponding undulation heights are varied step-wise in the sections I, II, and III. Similarly, the undulation lengths $1_I$, $1_{II}$ and $1_{III}$ are varied step-wise. The section with the largest undulation height in the undulation—i.e., the section III—is the section having the smallest rigidity. In case of deformation, it will at first deform with a predetermined force until the undulations form a practically no longer deformable block. Only near the end of this first deformation phase, the area II will deform until the undulations thereof are also compressed into a "block" and finally the area I is compressed until the entire undulated tubular member is deformed to block length.

The operation of the safety steering according to the present invention is such that in case of an impact of the driver onto the steering wheel 1, at first the deformation path of the impact pot 2 adjoining the same is used up. In case not a sufficient amount of impact energy is absorbed thereby, the connections of the outer column 7 with the fixed vehicle part 11 is thereafter released and the steering spindle 3 is displaced together with the outer column 7 in the direction away from the driver. The bracket or side bar 8 rigidly connected with the outer column 7 thereby runs up against the end of the undulated tubular member 12 and compresses the same whereby the outer column 7 serves as guidance against a lateral deflection of the undulated tubular member 12 during the deformation operation. It is achieved by the distance 15 between the bracket 8 and the upper end of the undulated tubular member 12 provided in the normal constructive condition that at first the force required for the disengagement of the connection of the bracket 8 with the fixed vehicle part 11 has to be applied without a start at the same time already of the deformation of the undulated tubular member 12 which would have led to an undesired force peak.

The impact of the body of the driver against the steering wheel in case of a collision can be lessened in that at first the forces required for the acceleration of the steering column masses determine far-reachingly alone the catching of the body and therewith the impact hardness and the energy-absorption by means of deformation members starts at first only moderately, and more particularly to the extent of the lessening of the acceleration forces. As a result thereof, the force peak at the beginning of the impact of the body can be reduced also under serious accident conditions to a tolerable or permissive extent and the following period of time can be utilized for the rapid and effective energy absorption while maintaining this retention or catching force at the same magnitude. The area under the force/path diagram, i.e., the extent of energy absorption, is maximally large.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What is claimed is:

1. A safety steering column assembly for a vehicle comprising in combination
   steering shaft means for connecting a steering wheel with a steering gear mechanism, said steering shaft means being axially collapsible,
   deformation means surrounding at least a portion of said steering shaft means for absorbing axial impact forces on said steering shaft means, said deformation means including an undulated tubular member having different axial rigidity values along different axial sectional portions of said undulated tubular member,
   guide means including a second tubular member interposed between said steering shaft means and said undulated tubular member for guiding said undulated tubular member only in the axial direction, said second tubular member having a greater axial extent than said undulated tubular member, wherein said second tubular member is axially movable upon impact against said steering wheel, support means for maintaining a first end of said undulated tubular member whch is remote from said steering wheel at a distance from an end wall of the vehicle, and bracket means for releasably securing said second tubular member to a fixed vehicle part at a position between the steering wheel and a second end of said undulated tubular member which faces said steering wheel, said bracket means being rigidly secured to said second tubular member at a predetermined axial distance from said second end of said undulated tubular member such as to be carried by said second tubular member against said second end of said undulated tubular member upon axial movement of said second tubular member occurring by said impact against said steering wheel, wherein said predetermined axial distance delays deformation of said undulated tubular member such that initial impact force peak is reduced.

2. A steering column assembly according to claim 1, wherein the different axial rigidity values of said undulated tubular member are varied step-wise over the length of the undulated tubular member.

3. A steering column assembly according to claim 2, wherein the wall thickness and material of said undulated tubular member are substantially unchanged over the length of the undulated tubular member, and wherein at least one of undulation depth or height and undulation length are varied over the lenth of the undulated tubular member.

4. A steering column assembly according to claim 3, wherein both the undulation height and the undulation length are varied over the length of the undulated tubular member.

5. A steering column assembly according to claim 2, wherein the step-wise variation of said different axial rigidity values occur in at least three different steps.

* * * * *